United States Patent [19]

Nelson

[11] Patent Number: 4,924,215
[45] Date of Patent: May 8, 1990

[54] FLAT PANEL COLOR DISPLAY COMPRISING BACKLIGHT ASSEMBLY AND FERROELECTRIC LIQUID CRYSTAL SHUTTER ASSEMBLY

[75] Inventor: Terence J. Nelson, New Providence, N.J.

[73] Assignee: Bell Communcations Research, Inc., Livingston, N.J.

[21] Appl. No.: 180,442

[22] Filed: Apr. 12, 1988

[51] Int. Cl.$^5$ ............................................. G09G 3/36
[52] U.S. Cl. .................................. 340/701; 340/784; 350/334; 350/350 S
[58] Field of Search ............... 340/716, 701, 702, 703, 340/704, 765, 784; 358/236, 240, 241, 230, 56, 59; 350/334, 345, 350 S, 339 F

[56] References Cited

U.S. PATENT DOCUMENTS

| | | | |
|---|---|---|---|
| 2,884,566 | 4/1959 | Kazan | 340/781 |
| 4,170,772 | 10/1979 | Bly | 340/701 |
| 4,238,793 | 12/1980 | Hochstrate | 340/716 |
| 4,384,763 | 5/1983 | Russo | 350/335 |
| 4,562,433 | 12/1985 | Biferno | 340/716 |
| 4,581,608 | 4/1986 | Aftergnt et al. | 340/784 |
| 4,632,514 | 12/1986 | Ogawa et al. | 350/339 F |
| 4,712,877 | 12/1987 | Okada et al. | 340/784 |

OTHER PUBLICATIONS

K. Iwasa, Journal of Electrical Engineering, pp. 33–37, Sep. 1986.
J. S. Patel et al., "Properties and Applications of Ferroelectric Liquid Crystals", Optical Engineering 26, (5) pp. 373–384, May 1987.
M. F. Bone et al., "Ferroelectric Liquid Crystal Display", Display, pp. 115–118, Jul. 1987.
S. Naemura et al., "High-Resolution and High-Speed Printing Head Using 18 Duty Multiplexed Ferroelectric Liquid-Crystal Shutter Display", SID Digest, pp. 356–359, 1987.
P. Migliorate, "Progress in Active Matrix Addressing of LCDs", Eurodisplay 1987, Proceedings of the Conference, pp. 44–54, 1987.
Green and Menown, "Flat Panel Liquid Crystal Waveguide Display", Proc. 1984, International Display Research COnference, pp. 199–201, 1984.
R. R. Kmetz, "Flat-Panel Displays", "International Electron Devices Meeting", Technical Digest, pp. 12–17, 1986.
T. P. Brody; "When–if Ever–Will the CRT be Replaced by a Flat Display Panel", Microelectronics Journal, vol. 11, no. 3, pp. 5–9, 1980.
G. W. Taylor, "A Method of Matrix Addressing Polarization Rotating or Retarding Light-Valve Arrays", Proc. of the IEEE, vol. 58, No. 11, pp. 1812–1818, Nov. 1970.

Primary Examiner—Jeffery A. Brier
Attorney, Agent, or Firm—James W. Falk

[57] ABSTRACT

A flat panel display is disclosed which comprises a row backlight assembly, e.g. a vacuum fluorescent device, and a column shutter assembly, e.g. a ferroelectric liquid crystal device, in front of the row backlight for forming luminous images. Color is achieved in the display by providing varying phase retardation of light passing through the ferroelectric shutter assembly. This is done by selectively varying the thickness of the ferroelectric liquid crystal at adjacent columns so as to correspond to the primary colors required to form a color display.

3 Claims, 5 Drawing Sheets

☐ = LIGHT EMISSION

4,924,215

FLAT PANEL COLOR DISPLAY COMPRISING BACKLIGHT ASSEMBLY AND FERROELECTRIC LIQUID CRYSTAL SHUTTER ASSEMBLY

BACKGROUND OF THE INVENTION

1. Field of the Invention

This invention relates to a matrix-type display and particularly to a coupled two part display, one part providing light emitting rows and the other part providing light modulating or switching columns.

2. Prior Art

There has been a long felt need for flat panel displays to replace the cathode ray tube which has dominated the display field for many years. New plasma structures, improvements in electroluminescence and liquid crystal display technology along with the concurrent improvement in high voltage and thin film transistor technology have led to small, emissive and reflective flat displays which are sold commercially In early flat-panel displays, e.g., electroluminscent displays, each picture element (pixel) was individually driven such that $N \times M$ drivers and interconnects were required for a display made of N rows and M colummns and having $N \times M$ pixels. This type of array is only practical economically and mechanically in an array with few elements, as in difital clock displays or the like. Matrix addressed displays then evolved which allowed addressing by only $N \times M$ interconnections and drivers. Since the cost and reliability of the display is often determined by the requirements of the electronics driving the display, this represented a great saving over the old type flat panel display, and such matrix addressed displays became more practical with the advent of surface mounted and thin film ICs.

Matrix addressing achieves these economies in drivers and interconnections by having many pixels share the same lines. Clearly those pixels are not independent of one another. Drive signals applied to a row and column to turn on the selected pixel at the intersection may also excite the unselected pixels attached to those lines. This means the display element must exhibit a threshold in its electro-optic response: row and column signals can be set below the threshold individually so they cause no response, while their coincidence will exceed the threshold and turn the element on. However, the drive on selected pixels can not be increased arbitrarily without bringing unselected pixels above threshold. Electro-optic phenomena which lack a discrete threshold have been excluded from display applications more complex than clocks.

One example of a prior art flat panel display employs a ferroelectric (FE) switching element which has a discrete threshold in combination with an electroluminescent (EL) panel. Here, the EL material was viewed directly and the FE element determined which matrix addressed EL pixel was activated.

Another example of a flat panel display utilizes twisted neumatic liquid crystals as the display media. Generally, these displays were reflective or transmissive in nature, requiring an external light source as the source of light. More recently, ferroelectric liquid crystal displays having response times several orders of magnitude faster than the twisted nematics as well as higher contrast ratios and wider viewing angles have been reported (K. Iwasa-Journal of Electrical Engineering, pp. 33-37, September 1986).

In all of the above devices, the rows and columns are integrated into a single or unitary structure. Often thin film, e.g., amorphous silicon film, transistors are formed directly on the structure for controlling the pixels. Such unitary structures often lead to higher manufacturing costs in that the manufacturing yield is determined by the operability of the entire complex panel, rather than of simple, interchangeable parts.

Another common element of the prior art devices is that the rows and columns of the matrix display are formed of the same type of active medium, that is, a liquid crystal layer which acts as a shutter or an electroluminescent layer which gives off light at the desired pixel.

SUMMARY OF THE INVENTION

The flat panel display devices of the present invention comprise a binary (back to back) structure wherein light emitting rows comprised of an electronically addressed luminous material (e.g., an electroluminescent layer or a plasma or vacuum fluorescent media) are applied on a first panel, and columns comprised of an electronically addressed shutter medium (e.g., a ferroelectric liquid crystal material between polarizers) are positioned on a second panel. Each panel comprising means for addressing the columns and rows on said panel, respectively, and said panels are coupled together back to back to form controllable pixels such that the shutter medium controls the light output from any illuminated row at each pixel, as observed by a veiwer.

DETAILED DESCRIPTION OF THE INVENTION

Figure 1:
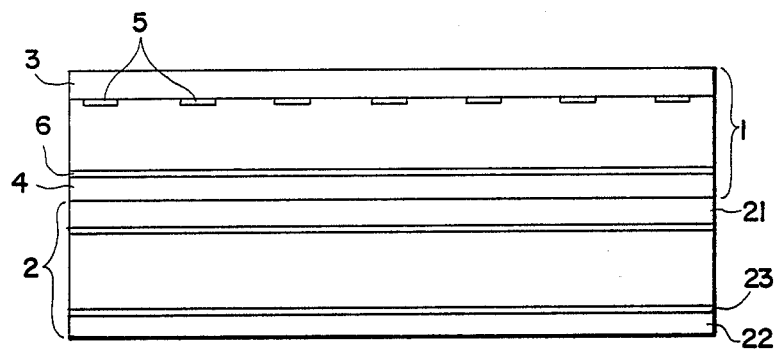
FIG. 1 is a side elevational view representative of an embodiment of the invention.

Generally, my novel device comprises an array of liquid crystal shutters oriented as columns in front of an array of luminous rows which are sequentially addressed. The column shutters, which are independently driven, are capable of changing state so that the intersection with each row (i.e., each pixel) may transmit or block light in response to a coded signal to form the desired image. Each row must be illuminated once per refresh cycle. Since the columns and rows are independently driven, there is no cross-talk to degrade the image. Since the drive circuitry does not tend to excite off rows and columns, their electrooptical responses need not have thresholds. By eliminating this restrictive limitation, and by separating the light emitting and light controlling means, the range of potentially applicable devices is greatly increased. To minimize parallax, it is preferred to minimize the space between the backlight rows and the shutters. This may be done by utilizing thin glass substrates, at least where the backlight and shutter assemblies abut; or one may utilize a common substrate having a continuous transparent electrode on each of its major surfaces, one for driving the row backlight and one for the column shutter.

For TV quality displays the refresh frequency of the drivers should be at least about 50 Hz to suppress flicker. Therefore, the response time of the shutters and backlights should be less than about 20 mn/N where N is the number of rows. Such a response time is achievable employing ferroelectric liquid crystal shutters.

Dividing the row and column access functions into separate components allows their design and processing to be separately optimized. Further, there is also a conductor pattern yield and cost improvement over displays having rows and columns on the same component. That is, selecting the two components independently improves the conductor pattern yield from $Y^2$ to Y, assuming row and column conductor yields are both equal to Y. This comparison is especially applicable to liquid-crystal displays incorporating thin-film transistors. Not only have the rows and columns of prior art thin film transistor liquid crystal displays presently been made on one substrate, but their yield is also reduced by shorting between row and column conductor where one crosses over the other.

Utilizing column shutters such as ferroelectric liquid crystals allows for the production of gray scale by means of pulse width modulation of the column drivers allowing for full video imaging. Color displays can be accomplished by tripling the number of light emitting rows, alternating the color output of each row, e.g. from red, green and blue, and synchronously applying the corresponding color picture signal to the rows and/or column shutters. This offers an advantage in reducing the total number of columns or rows for certain types of displays. For example, in certain graphic standard displays 640 columns by 200 rows are addressed. For a color row backlight-column shutter display at taught herein, 600 columns by 600 rows would be required as compared with a thin film transistor liquid crystal display with color filters which would require 1920 columns by 200 rows to achieve the same resolution. Here, however, if each color row is sequentially addressed, the response times of the luminous material and the shutter speed must be three times faster than for a monochrome display. Hence tripling the columns and using color filters or variable spacing in the columns as described below to provide birefringence colors are best for speed but require higher resolution patterning.

Displaying color information will require a line memory or frame memory to buffer information for two colors while the third is being displayed. Such memories are known in the display art. Alternatively, one could address a triad of rows at a time or individual rows having all three primary colors (emitting white light) in sequence thereby illuminating each of the three primary colors at one time, followed by illumination of another set of the three primary colors. In this configuration, the number of column shutters would have to be multiplied by three to select the desired color to be transmitted. Note that the product of the serial resistance and the parallel capacitance of a column is independent of its width. This means that dividing the columns into color triplets won't affect their risetime. On the other hand, the RC product does scale as the square of the column length, thus limiting the achievable display size. In other words the number of rows of the display is limited by the intrinsic speed of the shutters while the length of the columns is limited by the series resistance of the transparent electrodes and the parallel capacitance of the shutter material.

Fast shutters can be made with smectic C* (ferroelectic) phase liquid crystals. Unlike the twisted neumatic liquid crystal, these ferroelectric liquid crystals can be driven actively to both states with low voltage resulting in response times capable of video speeds. The voltage required, e.g. about 10 V, is compatible with CMOS IC's for use in the display drive circuits. Suitable ferroelectric liquid crystals and/or liquid crystal shutter assemblies have been reported in the article by K. Iwasa previously referred to herein and the following articles, all of which are incorporated herein by reference: *"Properties and Applications of Ferroelectric Liquid Crystals"*, J. S. Patel et al, *Optical Engineering* 26, (5) 373–384, 1987; "Ferroelectric Liquid Crystal Display Capable of Video Line Address Times," M. F. Bone et al, *Display* 115–118, July 1987; and "High-Resolution and High-Speed Printing Head Using ⅓-Duty Multiplexed Ferroelectric Liquid-Crystal Shutter Array", S. Naemura et al, *SID 87 Digest*, 356–359, 1987.

One form of suitable row backlight is a plasma display, e.g. a single sided plasma display as is known in the art. Such displays permit the use of phosphors without placing thh phosphor coating directly over the electrodes. Having the conductor pattern on one substrate and the phosphor on another substrate is particularly attractive in the display configuration of the present invention wherein the conductors all run in one direction.

Another suitable row-backlight would be an electroluminescent cell. One may either employ thin film or sintered powder electroluminescent cells driven by dc or ac excitation.

Figure 2:
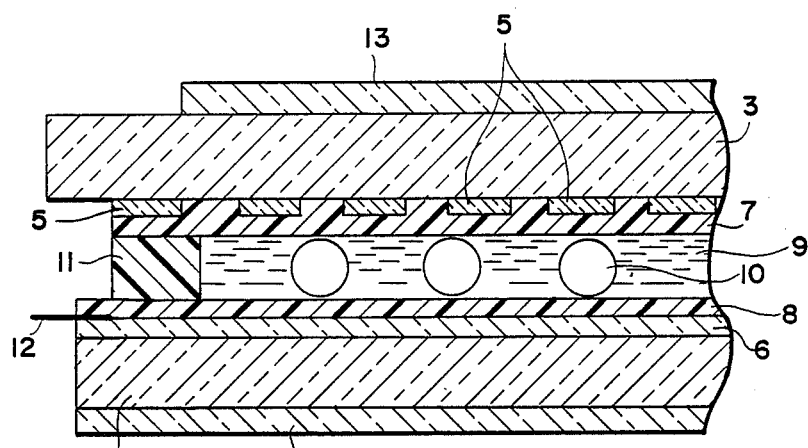
FIG. 2 is a side cross-sectional view of the shutter assembly of the display shown in FIG. 1.

Referring to the display device shown in FIG. 1, there is shown a two-part device wherein the upper-part is a liquid crystal column shutter assembly 1 and the lower part is a vacuum fluorescent row backlight assembly 2. Each of the assemblies 1 and 2 can be made by established techniques. The rows and columns of the assemblies are oriented orthogonally to each other. The liquid crystal column shutter is shown in greater detail in FIG. 2 an the vacuum fluorescent row-backlight is shown in greater detail in FIG. 3. Accordingly, the shutter assembly 1 comprises a pair of spaced thin glass plates 3 and 4. At least one of the plates, e.g. plate 3, is provided with a plurality of spaced transparent conductors 5, e.g. indium tin oxide connectors, on the inner surface thereof. The other plate, 4, has a counter electrode 6 comprising a continuous transparent conductive coating. The conductive coatings should preferably have a sheet resistance of no more than 125 ohms/square. Alignment layers 7 and 8 are provided over the conductive coatings 5 and 6 on plates 3 and 4 respectively. For example, a 0.5% solution of poly 1,4-butylene terephthalate in a solution of equal parts of 1,1,2,2-tetrachlorethane and 2-chlorophenol may be spun on the plates 3 and 4 and then dried. The alignment layers 7 and 8 may be rubbed along a common axis, preferably in the same direction to align the polymer. The alignment layers act to align a ferroelectric liquid crystal layer 9 which is deposed between the plates 3 and 4. A plurality of spacers 10, are provided between the plates to maintain a uniform liquid crystal layer thickness. Typically 2.75 to 5.0 micron spacers were employed. Spacers can be made of any uniform inert material such as plastic or glass spheres or fibers. A suitable smectic C* ferroelectriic liquid crystal mixture which is commercially available is designated as ZLI3654 and available from E. Merck & Co. This material typically has a nominal optical anisotrophy (delta n) of 0.13. However, other ferroelectric liquid crystal materials as described, for example, in the references mentioned above may be employed. Further, where response speed is not important one can use twisted nematic liquid crystals or any other electronically addressable shutter material. A resin 11, such as a Norland 61, a UV-curable epoxy, may be used to seal the edges of the shutter assembly 1.

The ferroelectric liquid crystal 9 is aligned in the cell by heating the cell above the isotropic transition temperature and then allowng it to cool slowly. Upon cooling the isotropic liquid becomes cholesteric with a pitch which is much larger than the cell gap. Alignment is achieved in this phase and is maintained upon further cooling and transition to the smectic phase. For the ZLI3654 material the isotropic to cholesteric transition is at 86° C. and the cholesteric to smectic transition occurs at about 76° C. The material remains in the smectic A state at temperatures between 76° C. and 62° C. and the ferroelectric smectic C* phase at temperatures between −30° C. and 62° C.

A wire 12 is soldered to the counter electrode 6. The column conductors 5 can be contacted with metallic pressure contacts (not shown) similar to those used for printed circuit card edge connectors. Alternatively, electrical contact may be established to conducting traces on a flexible backing by means of a conductive adhesive or to conducting traces on an inflexible circuit board by means of a flexible zebra connector as is well known in the art. On each of the outer surfaces of the glass plates 3 and 4 there is provided a polarizer-analyzer combination 13 and 14, respectively.

Figure 9:
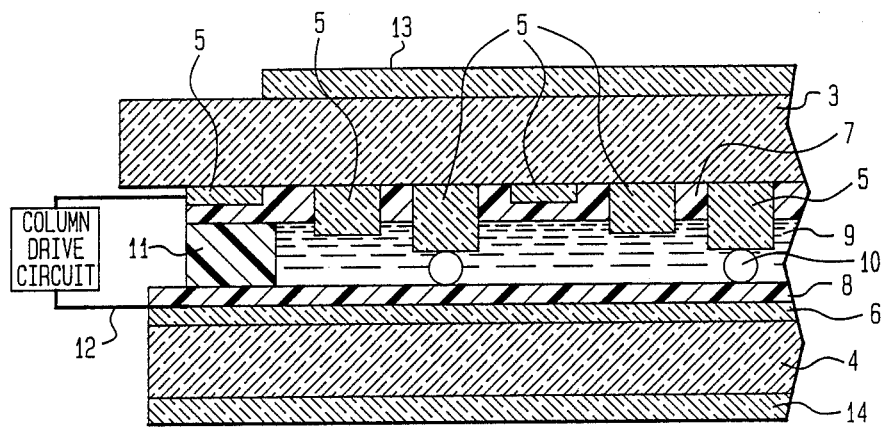
FIG. 9 is a modified version of the FIG. 2 shutter assembly adapted to form a color display.

Shutter assemblies without built-on polarizers made with ZLI3654 and different size spacers have been evaluated by applying a voltage and rotating the cell between crossed polarizers for best extinction. It was discovered that the color of the transmitted light varied with the thickness of the liquid crystal layer as determined by the size of the spacer. For example, thicknesses less than 2.75 microns resulted in a water-white appearance of transmitted light, while with 2.75 micron spacing the transmitting light appeared yellow. With 5.0 micron spacing, the ferroelectric liquid crystal acted as a switchable 3 pi phase retardation plate for wavelengths near 505 nm, which is the center of the blue-green spectrum emitted by the vacuum fluorescent display backlight. Hence, different colors are possible with different spacing. More generally, it is clear from these results that a color display can be made using coatings of different thicknesses over or under the column conductors to obtain different effective liquid crystal layer thicknesses and hence different color transmission within one array, as illustrated in FIG. 9 which shows a FIG. 2-type structure modified to include different liquid crystal layer thicknesses under the column conductors 5.

Figure 3:
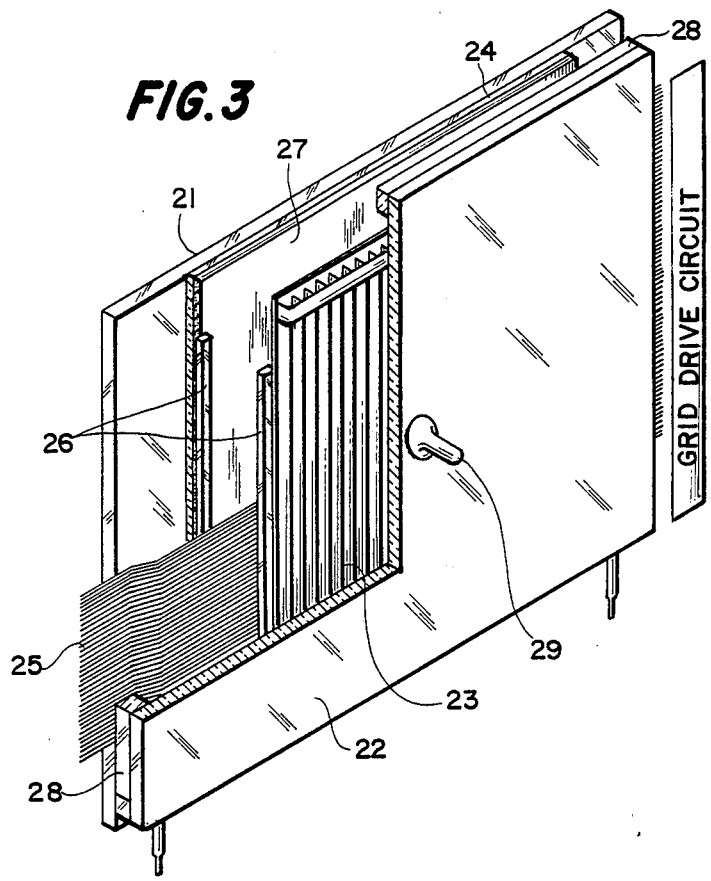
FIG. 3 is a partially cut-away isometric view of the row-backlight assembly of the display shown in FIG. 1.

The vacuum fluorescent row-backlight assembly of this embodiment, as seen in FIG. 3, comprises a pair of flat spaced support plates 21 & 22 having therebertween a filamentary cathode 23 spaced from the back support plate 22, a phosphor coated transparent anode layer 24 on the inner surface of the front support plate 21, and a multiplicity of spaced horizontal grids 25 between the spaced from the anode 24 and cathode 23, by means of spacers 26. The grids 25 are arranged to correspond to rows. A short persistance ZnO:Zn phosphor 27, commonly used in vacuum fluorescent displays (3 microseconds to 10% peak light emission), is suitable to the operation of the row-backlight, column-shutter display described herein. The phosphor is deposited on the anode 24. The structure of the row-backlight can be simplified as compared with matrix addressable graphic displays of this type in that one unpatterned phosphor bearing anode spanning the entire active area of the device can be employed. Normally, in matrix addressed displays, anodes are patterned into columns and are driven to a positive voltage when pixels in those columns are to be lit. If desired, the phosphor 27 may be deposited in rows corresponding to spaces between the grids 25 with a black insulating material between phosphor rows.

Figure 4:
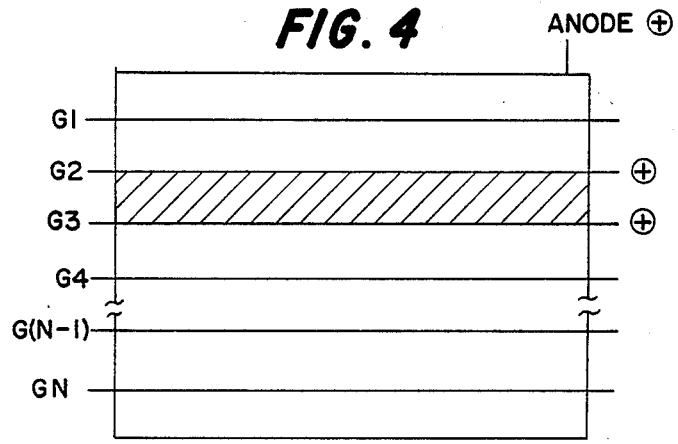
FIG. 4 is a schematic representation showing the electronic scanning of the display.

Operation of the vacuum fluorescent row-backlight is shown with respect to FIG. 4 wherein pairs of grids are driven by means of a grid drive circuit to a positive voltage, as in normal operation of vacuum fluorescent displays, with the anode energized. Only one grid pair at a time is selected and the pairs are sequenced in order from top to bottom of the grid structure. In this way, the backlight sequentially emits light one row at a time. The edges of the row backlight assembly are sealed by means of glass seals 28 to allow the assembly to be evacuated through one exhaust tube 29.

It should be understood that the row-backlight, column shutter display is not restricted to the use of a vacuum fluorescent device. Any row-addressable luminous device, preferably with short persistance (for most uses) and preferably having an emitting surface close to its upper physical surface to reduce loss due to interval absorption and to reduce parallax is suitable. Similarly, other column addressable shutters may be substituted for the ferroelectric liquid crystal shutter described herein.

Figure 5:
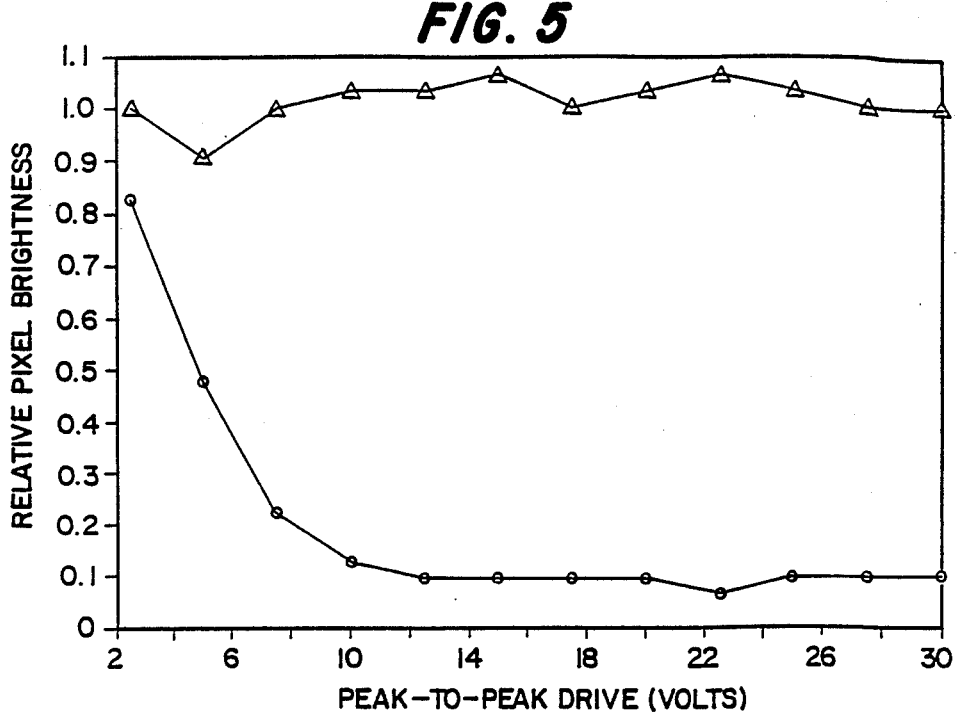
FIG. 5 is a plot showing relative picture element (pixel) brightness versus peak to peak column shutter drive voltage for pixels in both the "on" and "off" states utilizing compressed 2.75 micron plastic column shutter spacers.
Figure 6:
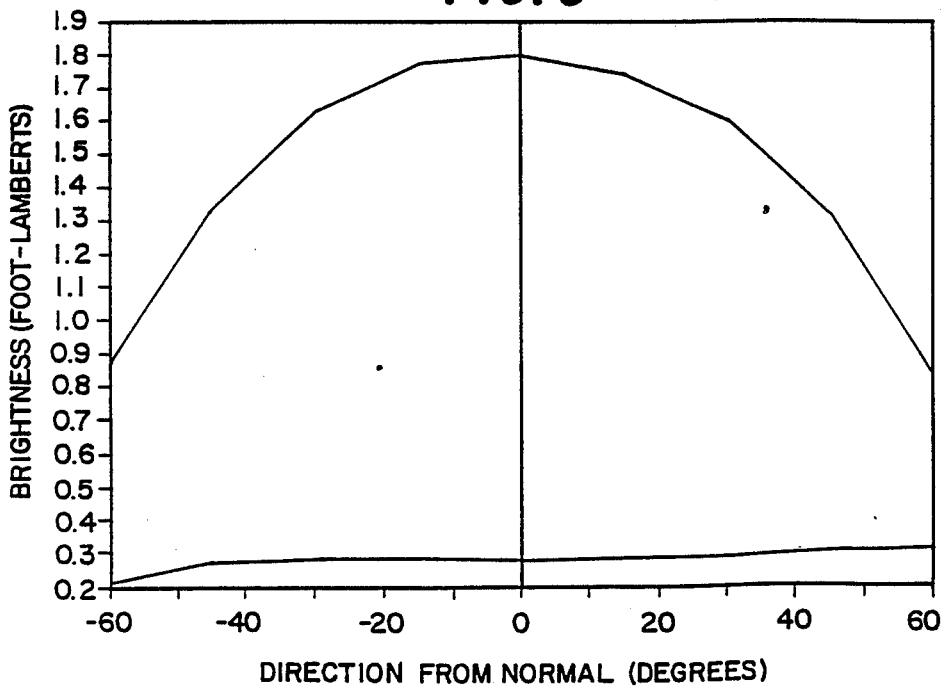
FIG. 6 is a plot of brightness versus viewing angle for a display utilizing 2.75 micron column shutter spacers.
Figure 7:
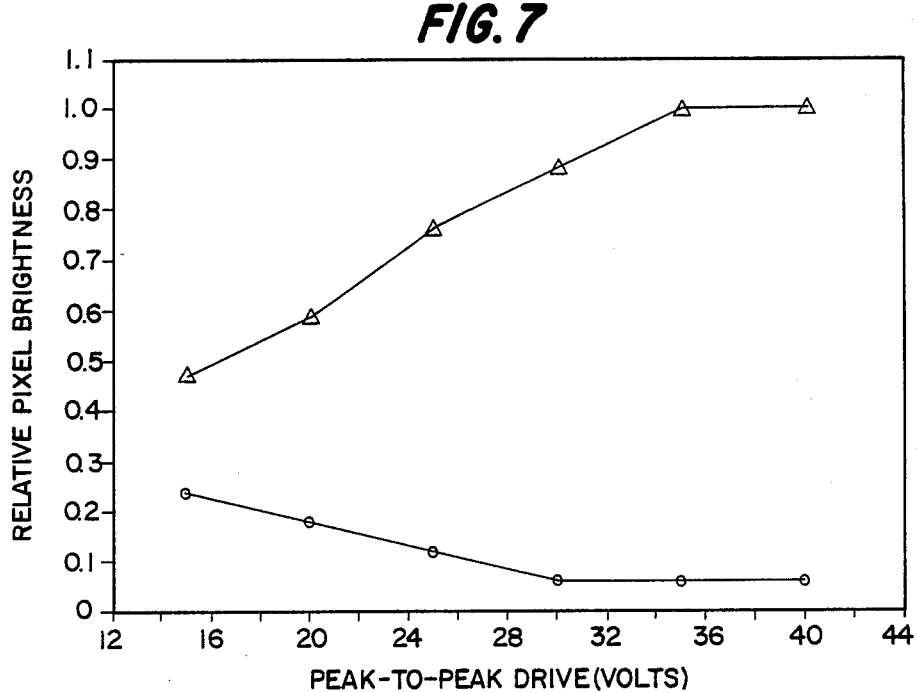
FIG. 7 is a plot showing reative picture element (pixel) brightness versus peak to peak column shutter drive voltage for pixels in both the "on" and "off" states utilizing 5.0 micron column shutter spacers.
Figure 8:
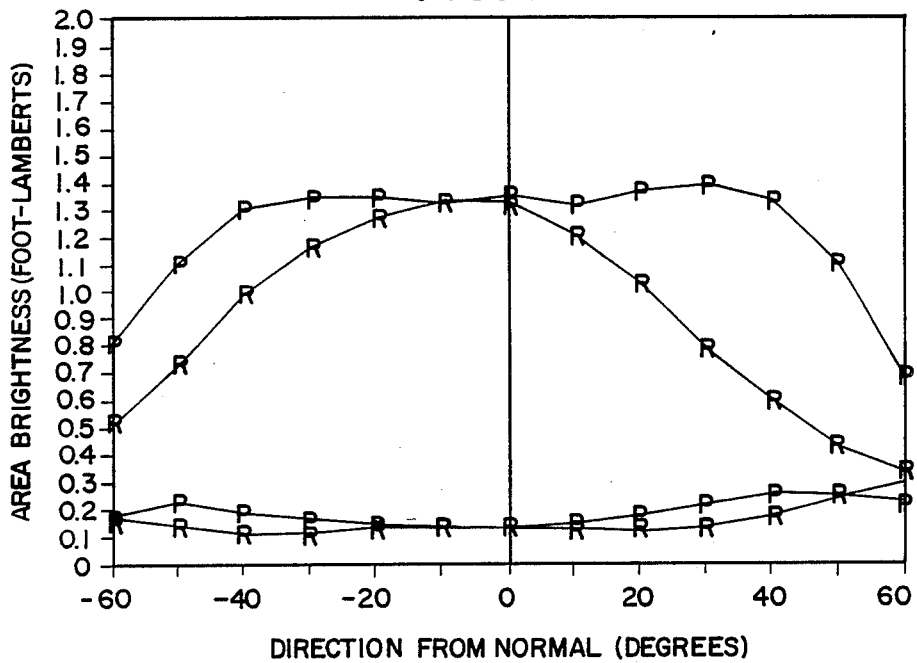
FIG. 8 is a plot of brightness versus viewing angle for a display utilizing 5.0 micron column shutter spacers measured both perpendicularly (P) and along (R) the direction of rubbing of the alignment layer in the column shutter assembly.

In a specific structure in accordance with my invention, column-shutters made with ZLI3654 were used with the vacuum fluorescent display backlight. Two horizontal scan times (about 120 microseconds) were allowed for shifting column data into position at the inputs of the column-driver transistors and for the electro-optic response time. As is well known, the time spent shifting can be saved by using latched outputs. In addition to the electro-optic response time, the RC time constant of the electrodes should be considered. Since this product is proportional to the square of the column length, it actually limits the maximum display size that can be achieved. For example with 1.25 inch long electrodes and <2.75 micron (compressed) spacers, an RC time constant of 1.5 microseconds was measured. The RC product is independent of column conductor width, and so does not limit the display resolution. The RC product does scale inversely with liquid crystal thickness, which adds to the possibility of color determined by thickness variations at 3 pi phase retardation as discussed above. In other words, increasing the spacing to achieve the birefringent colors available at 3 pi phase retardation also decreases the RC time constant of the shutters and thereby increases the maximum size of the display. On the other hand, the voltage required to operate the column shutters is increased too because the ferroelectric liquid crystal response time is inversely proportional to the electric field applied. To demonstrate the row-backlight, column-shutter display, the two rows in the vacuum fluorescent backlight addressed during the set-up time were kept dark. Then the succeeding 6 rows were turned on, making the effective pixel dimensions 3 mm high, since the dot pitch is 0.375 mm in the backlight, by 0.100 inch, which was the column pitch. Pixel contrast vs. voltage for the shutter incorporating the compressed 2.75 micron plastic spacers is indicated by FIG. 5. Only 10 volts peak-to-peak was required to achieve full contrast, though the spacing is known to be lower than 2.75 microns, due to compression, and the temperature was elevated by the backlight, which reached 35° C. after ½ hour of operation. According to the manufacturer of the liquid crystal, a switching time of about 20 microseconds is expected at 35° C. with 15 volts/micron applied. Assuming the spacing was actually about 2 microns, the switching time predicted at 10 volts peak-to-peak is 120 microseconds which agrees with the experimental data. The switching time at 20° C. is about half as fast, so heating of the liquid crystal by the backlight is beneficial under normal conditions. As shown in FIG. 6, the viewing angle of the display demonstrated with 2.75 micron spacers is wide. The data represents the average brighteners observed for the plane parallel to the rubbing axis (R), and the plane perpendicular to it (P). The brightness and constrast did not vary by more than a factor of 2 over a range of more than 90°. With 5.0 micron spacers, and otherwise under the same conditions, 35 volts peak-to-peak drive was required to produce full contrast (see FIG. 7). The viewing angle was still larger than 90° in the plane perpendicular to the rubbing axis. But parallel to the rubbing axis, the viewing angle dropped to about 90°, and it was asymmetrical, being shifted in the direction of the unidirectional rubbing (see FIG. 8).

What is claimed is:

1. A flat panel color display comprising a light emitting row backlight assembly, row backlight driver means for sequentially addressing one or more of said light emitting rows, a ferroelectric liquid crystal column shutter assembly disposed in front of said row backlight assembly including means for driving the column shutters of said assembly, spaced column electrodes coupled to said column shutter driving means, said row backlight and column shutter driver means synchronized to cause a desired image to be formed from said display, and wherein color is formed by means for providing varying phase retardation of light passing through the ferroelectric shutter assembly, wherein said means for providing a variation in said phase retardation comprises different thicknesses of said ferroelectric liquid crystal so as to correspond to the primary colors required to form a color display arranged sequentially along said columns.

2. A flat panel color display comprising a light emitting row backlight assembly, row backlight driver means for sequentially addressing one or more of said light emitting rows, a ferroelectric liquid crystal column shutter assembly disposed in front of said row backlight assembly including means for driving the column shutters of said assembly, spaced column electrodes coupled to said column shutter driving means, said row backlight and column shutter driver means synchronized to cause a desired image to be formed from said display, and wherein color is formed by means for providing varying phase of retardation of light passing through the ferroelectric shutter assembly, wherein the ferroelectric liquid crystal between adjacent columns is of a different thickness, said thickness varying such that the thickness of every third column is repeated and the thickness of each group of three columns being such that each column of said group transmits light of a different primary color, the combination of which creates a full color display.

3. The color display recited in claim 2 wherein the thickness variation is created by a variation in thickness of column electrodes.

* * * * *

UNITED STATES PATENT AND TRADEMARK OFFICE
CERTIFICATE OF CORRECTION

PATENT NO. : 4,924,215
DATED : May 8, 1990
INVENTOR(S) : Terence J. Nelson

It is certified that error appears in the above-indentified patent and that said Letters Patent is hereby corrected as shown below:

```
Column 1, line 24, "columnns" should read --columns--;
          line 28, "difital" should read --digital--;
          line 29, "N×M" should read --N+M--;
          line 60, "neumatic" should read --nematic--.
Column 3, line 37, "conductor" should read --conductors--;
          line 61, "provide" should read --produce--.
Column 4, line 39, "thh" should read --the--;
          line 57, "an" should read --and--.
Column 5, line 14, "ferroelectriic" should read --ferroelectric--;
          line 27, "allowng" should read --allowing--.
Column 6, line 7, "therebertween" should read --therebetween--.
Column 7, line 38, "constrast" should --contrast--.
```

Signed and Sealed this

First Day of November, 1994

Attest:

Attesting Officer

BRUCE LEHMAN

Commissioner of Patents and Trademarks